United States Patent [19]

Doi et al.

[11] Patent Number: 4,622,598
[45] Date of Patent: Nov. 11, 1986

[54] METHOD OF RECORDING ODD AND EVEN WORDS OF ONE CHANNEL PCM SIGNALS IN PLURAL TRACKS

[75] Inventors: Toshitada Doi, Kanagawa, Japan; Claudia Brandes, Ruemlang; Roger Lagadec, Zurich, both of Switzerland

[73] Assignees: Sony Corporation, Tokyo, Japan; Willi Studer AG, Regensdorf, Switzerland

[21] Appl. No.: 637,229

[22] PCT Filed: Dec. 6, 1983

[86] PCT No.: PCT/JP83/00430
§ 371 Date: Jul. 27, 1984
§ 102(e) Date: Jul. 27, 1984

[87] PCT Pub. No.: WO84/02417
PCT Pub. Date: Jun. 21, 1984

[30] Foreign Application Priority Data

Dec. 6, 1982 [JP] Japan .................. 57-213613

[51] Int. Cl.⁴ .................. G11B 5/02; G11B 5/09; G06F 11/10
[52] U.S. Cl. .................. 360/22; 360/32; 371/39; 371/40
[58] Field of Search .................. 360/32, 22; 371/38, 371/39, 40

[56] References Cited

U.S. PATENT DOCUMENTS

| | | | |
|---|---|---|---|
| 4,211,997 | 7/1980 | Rudnick et al. | 371/38 |
| 4,238,852 | 12/1980 | Iga et al. | 371/38 X |
| 4,389,681 | 6/1983 | Tanaka et al. | 360/27 |
| 4,393,502 | 7/1983 | Tanaka et al. | 371/40 |
| 4,398,224 | 8/1983 | Watanabe | 371/38 X |
| 4,403,261 | 9/1983 | Tanaka | 360/32 X |

Primary Examiner—Raymond F. Cardillo
Assistant Examiner—Alyssa H. Bowler
Attorney, Agent, or Firm—Lewis H. Eslinger

[57] ABSTRACT

Described is a method for PCM signal recording in which, when single-channel or multichannel PCM signals are recorded so that one-channel PCM signals are recorded in plural recording tracks, the input PCM signals of one channel are correspondingly distributed to the plural recording tracks with at least one word as a unit, and in which the distributed plural signals are subjected to an encoding operation independently of one another and are recorded on the plural recording tracks. In distributing the input PCM signals by word units, word groups consisting of a predetermined number of consecutive words are sequentially distributed to the recording tracks, or plural consecutive words equal in number to the number of recording tracks are distributed to the tracks. In encoding, the input words are separated as a function of whether the input word numbers are odd or even, and the words thus separated are subjected to time delaying or interleaving operations, after which the odd and even number words are synthesized.

6 Claims, 14 Drawing Figures

| SYNC | W''₁₂ | W''₁₁ | W''₈ | W''₇ | W''₄ | W''₃ | Q'₂ | Q'₁ | P''₂ | P''₁ | W''₁₀ | W''₉ | W''₆ | W''₅ | W₂ | W₁ | CRC CODE |

METHOD OF RECORDING ODD AND EVEN WORDS OF ONE CHANNEL PCM SIGNALS IN PLURAL TRACKS

TECHNICAL FIELD

This invention relates to a method for recording PCM signals, according to which one-channel PCM signals are distributed and recorded on plural recording tracks. More particularly, it relates to the method for recording PCM signals according to which the effect of encoding such as interleaving or addition of error correcting codes is not cancelled at the time of distribution and recording.

BACKGROUND ART

In recording or reproducing PCM signals in general, coding errors are caused in known manner due to defects in the recording medium, troubles in recording or reproduction, noises or disturbances. Thus an encoder is provided at the recording side to effect interleaving (data rearrangement) or addition of parity or error correcting codes, while a decoder is also provided at the reproducing side to effect deinterleaving (the reverse of interleaving), error detection and correction, or data interpolation.

When plural recording tracks are associated with each channel of single-channel or multichannel PCM signals for recording or reproduction, the signals are first passed through the aforementioned encoder, and are then distributed by switching distributing means, such as a multiplexer, to the recording heads. In this case, even when the interleaving operation is performed at the encoder in accordance with a predetermined rule, the effect of interleaving may be lowered at the time that the signals are distributed to the respective tracks by the multiplexer. In addition, since the error correcting code words are provided to the respective word rows allotted to plural tracks, it becomes impossible to perform a normal error correction in the event that the signals are absent in a given track for a prolonged time. Moreover, the allowable limit for error occurrence becomes narrow as a whole.

In view of the foregoing, it is a principal object of the present invention to provide a method of recording PCM signals according to which, when the PCM signals for one channel are distributed and recorded in plural tracks, the encoding operation such as the aforementioned interleaving or addition of error code may be improved in validity, thus assuring high-quality recording and reproduction of the PCM signals.

DISCLOSURE OF THE INVENTION

For accomplishing the above object, the present invention contemplates to provide a method for recording PCM signals wherein each channel of the PCM signals of at least one channel is correspondingly distributed to plural recording tracks for recording, characterized in that respective words of the PCM signals for one channel are correspondingly distributed to said recording tracks by switching distributing means in accordance with a predetermined matrix pattern, these PCM signals composed of these distributed words and associated with the respective tracks are supplied to plural recording heads through respective separate encoders adapted for separately correcting code error in such a manner that plural recording tracks are formed on the recording medium.

The aforementioned switching distributing means may for example be so designed that word sets each consisting of a predetermined number of consecutive words are distributed successively to respective recording tracks. Alternatively, it may be so designed that a plurality of consecutive words of the input PCM signals equal to the number of the recording tracks for one-channel PCT input signals are allotted word by word to said recording tracks. The aforementioned encoder is preferably so designed that the word row or group corresponding to one recording track is divided into the odd number words and even number words in the order of input, the odd and even number words thus separated from each other are shifted by a predetermined time interval from each other, the odd and even number words are subjected separately to code error correcting encoding, and the odd and even number words thus shifted in timing and coded are combined and supplied as output.

BEST MODE FOR EXECUTION OF THE INVENTION

The present invention is now described by referring to an embodiment as applied to a fixed head type PCM sound recorder.

First of all, a fixed type PCM sound recorder, such as described in U.S. Pat. No. 4,389,681 is described by way of an example.

For widespread use of the fixed head type PCM recording and reproducing apparatus, it is desirable that the recording format, such as number of tracks allotted to each channel, be unified. However, when the PCM signals subjected to coding with the same redundancy are to be recorded with the same linear density, since the number of tracks is inversely proportionate to the tape speed, it is difficult to reach a sole unified recording format, when the object of use is taken into consideration. For example, the method of recording one-channel PCM signals in one track is advantageous in that a plurality of channels can thereby be recorded, but it is disadvantageous in that the recording time for a predetermined tape length becomes shorter due to the increased tape speed, or in that the tape drive system is complex in design because of the necessity for controlling tape travel to a predetermined manner. On the contrary, the method of recording one-channel PCM signals in a plurality of tracks provides for a decreased tape speed, but it is unable to increase the number of channels.

In the example described below, the PCM signals are recorded by three kinds of recording formats having different numbers of tracks per channel.

Figure 1:
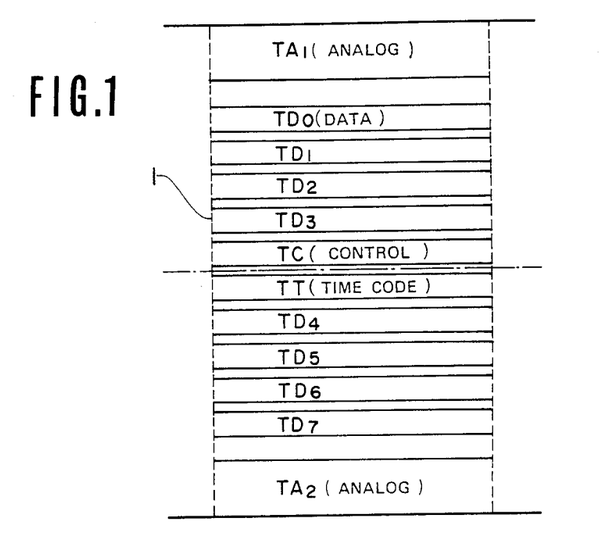
FIG. 1 is a schematic plan view showing an example of the track pattern to which the present invention can be applied.

The number of data tracks that can be recorded on the magnetic tape depends on the tape width. For example, 8 data tracks $TD_0$ to $TD_7$ are formed on a magnetic tape 1 which is ¼ inch wide, as shown in FIG. 1. Tracks $TA_1$, $TA_2$ for recording of analog signals are formed on the upper and lower edges of the magnetic tape 1, while 8 data tracks $TD_0$ to $TD_7$, a control track TC and a time code track TT are formed between the analog tracks $TA_1$ and $TA_2$. To the upper side of a center (shown by a chain-dotted line) of the magnetic tape 1, the control track TC is positioned, and the data tracks $TD_0$ to $TD_3$ are located between the analog track $TA_1$ and the track TC. To the lower of the center of the magnetic tape 1, there is positioned the time code track TT, and the data tracks $TD_4$ to $TD_7$ are located between the track TT and the analog track $TA_2$.

When the magnetic tape 1 is ½ inch wide, analog tracks $TA_1$, $TA_2$ are formed on the upper and lower edges of the magnetic tape, 12 data tracks $TD_0$ to $TD_{11}$ and the control track TC are formed on the upper half of the tape, while 12 data tracks $TD_{12}$ to $TD_{23}$ and the time code track TT are formed on the lower half of the tape. Further, when the magnetic tape is 1 inch wide, analog tracks $TA_1$, $TA_2$ are formed on the upper and lower edges of the tape, respectively, 24 data tracks $TD_0$ to $TD_{23}$ and the control track TC are formed on the upper half of the tape, while time code track TT and 24 data tracks $TD_{24}$ to $TD_{47}$ are formed on the lower half of the tape.

As a matter of course, interchangeability for different widths of the magnetic tape 1 need not be taken into consideration.

The recording format for a ¼ inch tape width is shown as an example in Table 1 below.

TABLE 1

|  | Format A | Format B | Format C |
|---|---|---|---|
| number of channels | 8 | 4 | 2 |
| number of tracks | 1 | 2 | 4 |
| tape speed (cm/s) | 76.00 | 38.00 | 19.00 |

The above tape speed corresponds to the sampling frequency $f_s$ for the PCM signals equal to 50.4 kHz. The sampling frequencies $f_s$ of 44.1 or 32.0 kHz are also possible for tape speeds different from the above values. The PCM signal code formation and modulation type are common for the respective formats. The Table 2 below shows the typical relation between the data tracks $TD_0$ to $TD_7$ and the associated channels for these formats.

TABLE 2

| Data track | Format A | Format B | Format C |
|---|---|---|---|
| $TD_0$ | CH1 | CH1-A | CH1-A |
| $TD_1$ | CH2 | CH2-A | CH2-A |
| $TD_2$ | CH3 | CH3-A | CH1-C |
| $TD_3$ | CH4 | CH4-A | CH2-C |
| $TD_4$ | CH5 | CH1-B | CH1-B |
| $TD_5$ | CH6 | CH2-B | CH2-B |
| $TD_6$ | CH7 | CH3-B | CH1-D |
| $TD_7$ | CH8 | CH4-B | CH2-D |

Thus, one channel is recorded as one data track and two data tracks A, B for the formats A and B, respectively, whereas one channel is recorded as four tracks A, B, C and D, for the format C.

Next, the relation among data track TD, control track TC and time code track TT is explained.

When the format A for recording one-channel signals in one track is applied to the magnetic tape ¼ inch wide, the respective audio PCM signals for the eight channels $CH_1$ to $CH_8$ are recorded on the eight data tracks $TD_0$ to $TD_7$ shown in FIG. 1 in the predetermined coded form.

Figure 2A:
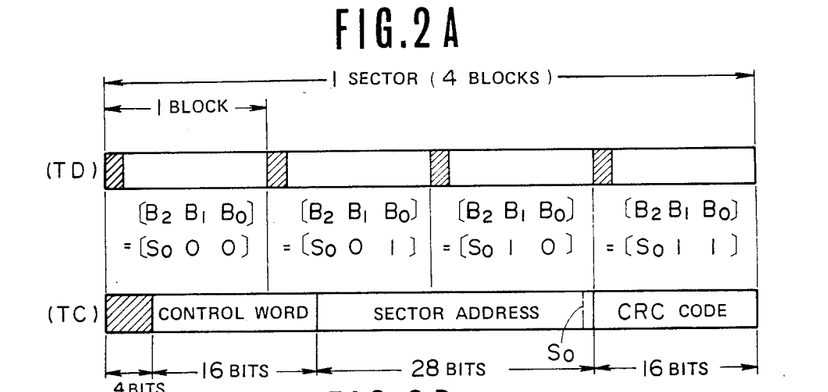
FIGS. 2A and 2B shows the construction of signals recorded on the data and control tracks.
Figure 2B:
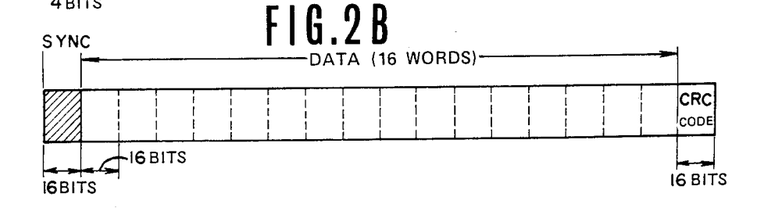

As shown in FIG. 2A, the data track TD ($TD_0$–$TD_7$) and the control track TC are so placed relative to each other that the end point of one sector of the data track is in register with the end point of one sector of the control track. 4-block data are present in one sector of data track TD. As shown in FIG. 2B, one transmission block (referred to simply as block) is made up of 16-word data with each word consisting of 16 bits, a data sync signal (indicated by hatching) added to the beginning of the word and a CRC code added to the end of the word. A 3-bit block address signal is inserted in the data sync signal domain, with the block address signal and the data being checked for error by CRC. Each sector of the control track TC is composed of a 4-bit control word (shown by hatching), a 16-bit control word, a 28-bit sector address signal and a 16-bit CRC code. The control word is used for discerning the recording format and sampling frequency of the PCM audio signals to be recorded, while the sector address is an absolute address incrementing from an address zero, with the control word and the sector address being checked for error by CRC. A modulation system making possible high-density recording such as 3 PM type is used for recording on the control track TC, whereas FM type is used for recording on the control track TC. The least significant bit $S_0$ of the sector address signal is made to be in register with the most significant bit of each block address signal of the four blocks of the sector. Thus the block address [$B_2$ $B_1$ $B_0$] is sequentially changed in the sector in the order of [$S_0$ 00], [$S_0$ 01], [$S_0$ 10] and [$S_0$ 11].

Figure 3:
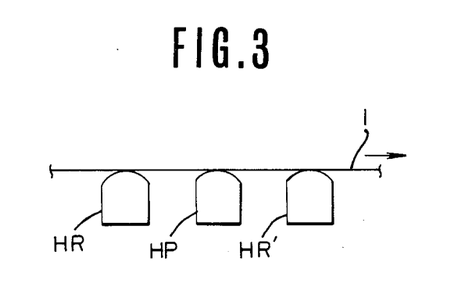
FIG. 3 shows an example of head arrangement.

As shown in FIG. 3, a recording head HR, a reproducing head HP and a recording head HR' are arranged in this order in the proceeding direction of the magnetic tape 1. Each of these heads has ten in-line recording or reproducing magnetic gaps arranged transversely of the magnetic tape 1, of which eight gaps are associated with data tracks $TD_0$ to $TD_7$, and the remaining two gaps are associated with the control track TC and time code track TT. The first recording on the magnetic tape 1 is by the recording head HR, while the recording head HR' is used for sync-recording, cut in/out, etc. Rewriting of the control track TC once formed by the recording head HR is not allowed, with rewriting being made only of the data track.

Figure 4:
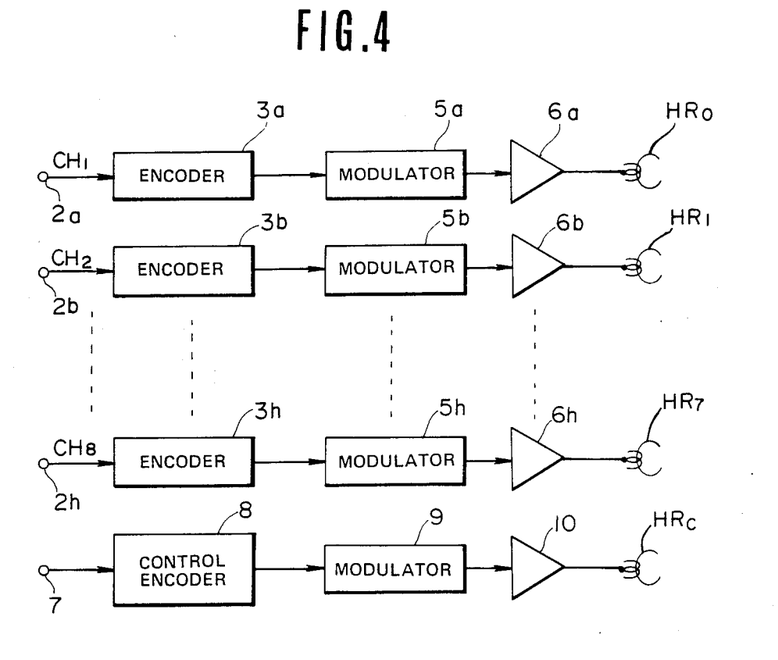
FIGS. 4 and 5 are block diagrams showing examples of construction of the recording and reproducing systems for recording the format A.
Figure 5:
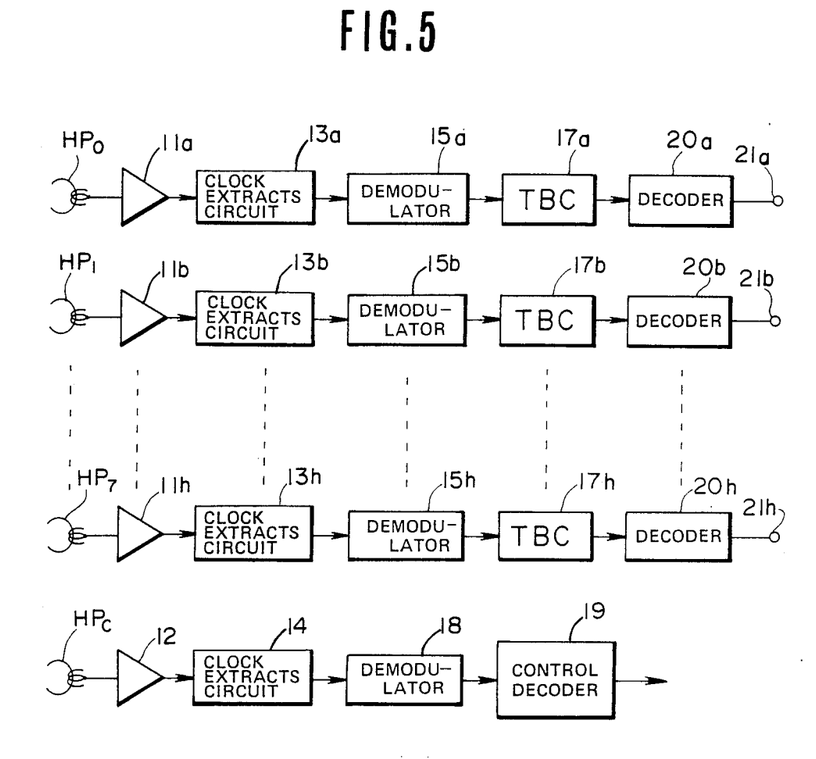

FIG. 4 shows the construction of the recording system and FIG. 5 the construction of the reproducing system. Audio PCM signals for channels $CH_1$ to $CH_8$ are supplied from input terminals $2a$ to $2h$ to encoders $3a$ to $3h$ respectively. Each of the encoders $3a$ to $3h$ is provided with an interleave circuit, parity generator, CRC addition circuit and a sync signal addition circuit etc. and forms a code block consisting of a 6-word PCM word and a 2-word parity word. A train of data from the encoders $3a$ to $3h$ are supplied to the recording heads $HR_0$ to $HR_7$ through modulators $5a$ to $5h$ and recording amplifiers $6a$ to $6h$. The recording heads $HR_0$ to $HR_7$ are arranged in-line transversely of the magnetic tape 1.

The above described signals are recorded on the control track TC by the recording control head $HR_c$. The signals recorded on the control track TC are formed at the control encoder 8 from the discerning signals and timing signals supplied from the terminal 7, and are supplied to the recording control head $HR_c$ through modulator 9 and recording amplifier 10.

Facing respectively to the data tracks $TD_0$ to $TD_7$ and the control track TC of the magnetic tape 1 are a series of reproducing heads $HP_0$ to $HP_7$ and a reproducing control head $HP_c$. As shown in FIG. 5, the outputs of the reproducing heads $HP_0$ to $HP_7$ and $HP_c$ are supplied via reproducing amplifiers $11a$ to $11h$ and 12 to clock extracting circuits $13a$ to $13h$ and 14. The extracting circuits $13a$ to $13h$ and 14 are adapted for extracting bit clocks synchronized with the reproducing signals. The outputs of the extracting circuits $13a$ to $13h$ are supplied via demodulators $15a$ to $15h$ for data strings of the respective channels to time axis compensation circuits (TBC) $17a$ to $17h$. The outputs from clock extracting circuit 14 are supplied to a demodulator 18 where reproducing control signals are obtained and supplied to a control decoder 19.

The demodulators $15a$ to $15h$ are associated with data sync signal separating circuits.

Capstan servoeing signals are generated by the control decoder 19. As described in U.S. Pat. No. 4,398,224, the TBC makes use of the block addresses recorded in the respective data tracks $TD_0$ to $TD_7$ for determining the write addresses of the memories associated with TBC's $17a$ to $17h$. Read-out from the TBC's $17a$ to $17h$ is by reference clock pulses, and a train of data free from time axis fluctuations are supplied to the outputs of the TBC's $17a$ to $17h$. The train of output data from these TBC's $17a$ to $17h$ are supplied to the decoders $20a$ to $20h$. Each of the decoders $20a$ to $20h$ is provided with a CRC checker, a deinterleave circuit, an error correction circuit and an error compensation circuit. Reproduced audio PCM signals are supplied to output terminals $21a$ to $21h$.

Figure 6:
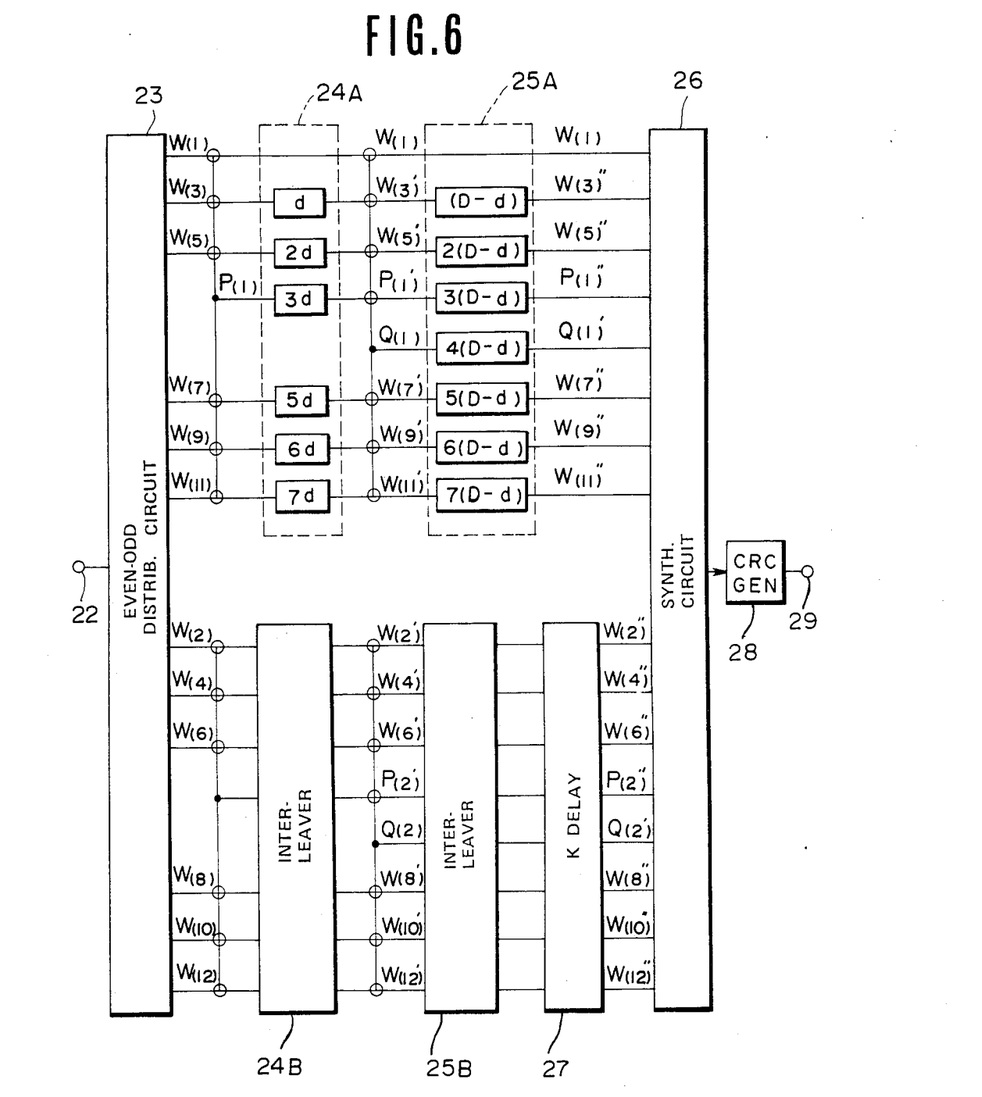
FIG. 6 is a block view showing an example of construction of the encoder arrangement.

The recording system has a series of encoders $3a$ to $3h$ constructed in the similar manner, as shown by way of an example in FIG. 6. A train of one-channel PCM data composed of successive words $W_i$ are supplied from terminal 22 to an even-odd distributor 23 where they are divided into 12 data groups, that is, data groups $W(1)$, $W(3)$, $W(5)$, $W(7)$, $W(9)$ and $W(11)$ each consisting of odd numbered words and data groups $W(2)$, $W(4)$, $W(6)$, $W(8)$, $W(10)$ and $W(12)$ each consisting of even numbered words. The data groups consisting of odd numbered words and the data groups consisting of the even numbered words are subjected to error correction and encoding operations independently of one another. These data groups are composed of the following words.

$W(1) = (W_1, W_{13}, W_{25}, \ldots)$
$W(3) = (W_3, W_{15}, W_{27}, \ldots)$

-continued $W(11) = (W_{11}, W_{23}, W_{35}, \ldots)$
$W(2) = (W_2, W_{14}, W_{26}, \ldots)$
$W(4) = (W_4, W_{16}, W_{28}, \ldots)$ $W(12) = (W_{12}, W_{24}, W_{36}, \ldots)$ The six words taken from data groups $W(1)$–$W(11)$ consisting of odd numbered words are supplied to a (mod. 2) adder for forming first parity data groups $P(1)$. For example, $(P_1 = W_1 \oplus W_3 \oplus W_5 \oplus W_7 \oplus W_9 \oplus W_{11})$. These data groups are supplied to an interleaver 24A. The interleaver 24A has delay circuits adapted for providing delays equal to 0, d, 2d, 3d, 5d, 6d and 7d, where d is a unit delay quantity (block). A delay quantity equal to 3d is added to the parity data groups $P(1)$. The respective words taken from the respective data groups appearing at the output of the interleaver 24A are supplied to the (mod. 2) adder where the second parity data groups $Q(1)$ are formed. These six data groups $W(1)$ to $W(11)$ and parity data groups $P(1)'$, $Q(1)$ are supplied to an interleaver 25A. The interleaver 25A has delay circuits for providing delays equal to 0, (D−d), 2(D−d), 7(D−d), while delays equal to 3(D−d) and 4(D−d) are allotted to the parity data groups $P(1)'$, $Q(1)$. The eight data groups $W(1)$–$W''(11)$ produced in the interleave circuit 25A are supplied to a synthesizer 26.

The above described interleave circuit consists of two tandem connected interleavers 24A, 25A. Delay quantities 0, D, 2D, ---, 7D are allotted to the respective data groups and parity data are formed from words taken from the respective data groups appearing at the dividing points (cross interleaving). The unit delay quantities d, D are chosen so that the least common multiple of d and (D−d) exceeds 7D so that plural words contained in a code block of the first parity data and plural words contained in a code block of the second parity data have a maximum of one word in common with each other. For example, d=2 and D=17.

The PCM data groups $W(2)$–$W(12)$ composed of even-numbered words from the even-odd distributor 23 are subjected to an error correction coding through using the cross interleaving as described above and by means of the tandem connected interleavers 24B, 25B and the (mod. 2) adder. The coded data groups are supplied to a delay circuit 27 causing a delay equal to K (blocks) and the data groups $W(2)$−$W'''(12)$ appearing at the outputs are supplied to the synthesizer 26. The purpose of affording a uniform delay of K to the data groups consisting of the even-numbered words is to perform an error correction or compensation even in instances where errors occur frequently at the editing points in the case of splice editing.

Figure 7:
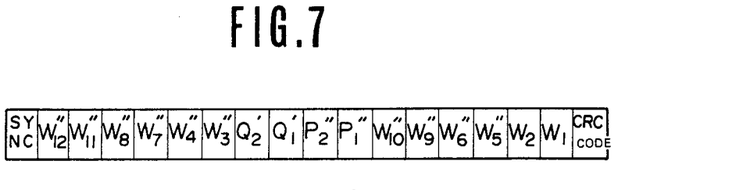
FIGS. 7 and 8 show the signal construction for one block and the manner of interleaving.

The coded data groups described above are supplied to the synthesizer 26 where the 12-word PCM data taken from the respective groups and 4-word parity data are arranged into a one-block data to which the CRC code is added at the CRC generator 28 and the resulting signal is taken from an output terminal 29. A sync addition circuit, not shown, is provided to the output terminal 29 for forming the signal block as shown in FIG. 7.

Figure 8:
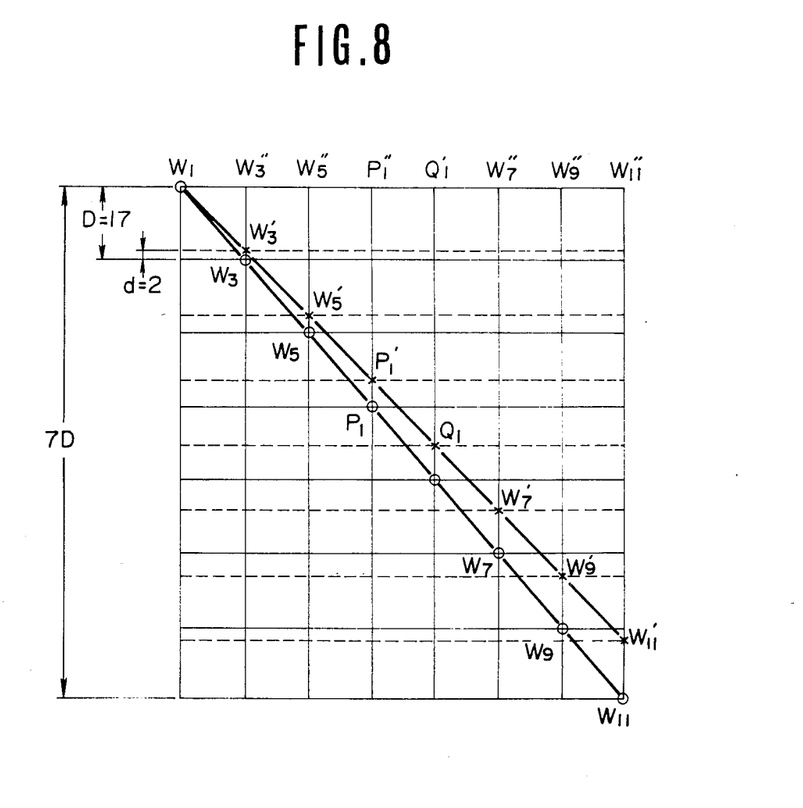

In the above described embodiment of the invention, the data groups donsisting of the odd-numbered PCM words and the data groups consisting of the even-numbered PCM words undergo separate coding so that the interleaving manner of, for example, the odd-numbered data groups are as shown in FIG. 8. As interleaved, output, when the timing at which the data [$W_1$, $W_3''$, $W_5''$, $P_1''$, $Q_1'$, $W_7''$, $W_9''$ and $W_{11}''$] appear is used as reference, the code blocks including PCM word $W_1$ are formed by plural words indicated by mark O and plural words indicated by marks X. Thus the code block which gives the parity word $P_1$ is [$W_1$, $W_3$, $W_5$, $P_1$, $W_7$, $W_9$] whereas the code block which gives the parity word $Q_1$ is [$W_1$, $W_3'$, $W_5'$, $P_1'$, $Q_1$, $W_7'$, $W_9'$, $W_{11}'$]. When recorded on the magnetic tape, the words of these code blocks are distributed at intervals of ($D = 17$ blocks) and $D - d = 15$ blocks. In such cross-interleaving, the length of the code series is ($7D = 119$ blocks).

Figure 9:
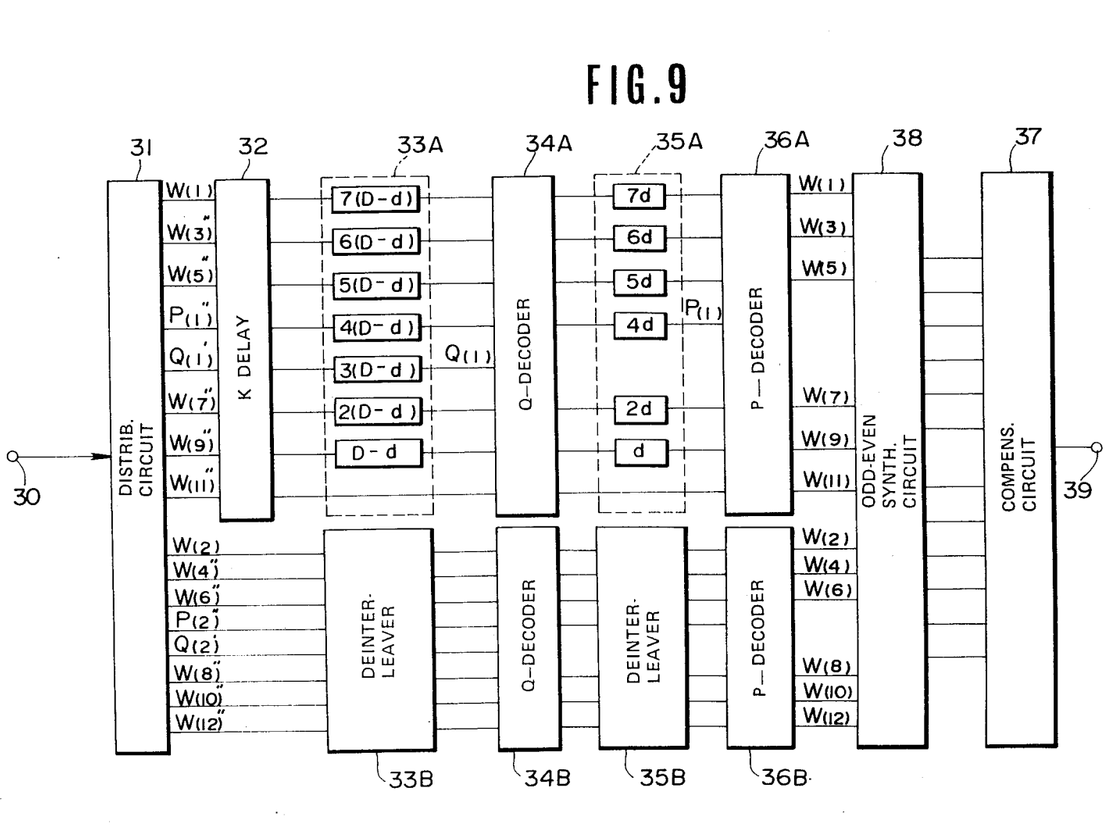
FIG. 9 is a block diagram showing an example of decoder construction.

The decoders $20a$ to $20h$ in the reproducing system are constructed in the similar manner as shown by way of an example in FIG. 9. A train of data to be reproduced (reproducing data) are supplied from terminal 30 to a distributing circuit 31. The train of data are already error checked per each transmission block at the preceding stage by CRC checker and 1-bit error flags representative of the check results are separately added to the respective words. These data are distributed by the circuit 31 into a set consisting of six PCM data groups $W(1) - W'''(11)$ and two parity data groups $P''(1)$, $Q'(1)$ and another set consisting of the remaining six PCM data groups $W(2) - W'''(12)$ and two parity data groups $P''(2)$, $Q'(2)$, these sets being error-corrected independently of each other. First of all, the odd-numbered words and the associated data groups are supplied to a delay circuit 32 where they are delayed by K blocks uniformly, after which they are supplied to deinterleaver 33A. The deinterleaver 33A affords to the respective data groups delay quantities equal to $7(D-d)$, $6(D-d)$, $5(D-d) \cdots 0$ for cancelling the delays introduced by the interleaver 25A. The output data groups supplied from deinterleaver 33A are supplied to a Q decoder 34A where error correction is performed by using second parity data group $Q(1)$. The data groups except $Q(1)$ are supplied to deinterleaver 35A. The deinterleaver 35A is so arranged as to afford delay quantities equal to 7d, 6d, --- 0 to the data groups for cancelling the delay introduced by the interleaver 24A of the recording system. The output from the deinterleaver is supplied for error correction to the P decoder 36A. By the error correction performed at the Q decoder 34A and P decoder 36A, an error flag concerning the corrected word is cleared and replaced by one indicating the absence of error. At the outputs of the P decoder 36A, there appear PCM data groups $W(1) - W(11)$ consisting of even-numbered words.

Concerning PCM data groups consisting of even-numbered words and the associated parity data groups $W(2) - W(12)$, there are provided a deinterleaver 33B, a Q-decoder 34B, a deinterleaver 35B and a P-decoder 36B so that error-corrected PCM data groups appear at the output of the P-decoder 36B. The PCM data groups $W(1) - W(12)$ appearing at P-decoders 36A, 36B are supplied to an even-odd synthesizer 38, the output of which is supplied to a compensating circuit 37 where the uncorrected error words are interpolated with the average value of the neighboring correct words. The output of the compensating circuit 37 is obtained at output terminal 39 as PCM audio signal. There are provided Q decoders 34A, 34B and P decoders 36A, 36B for performing error corrections twice for elevating an error correcting capability.

In the case of a B format in which one-channel signals are distributed in two tracks for recording and a C format in which one-channel signals are distributed in four tracks for recording, the aforementioned system of the U.S. Pat. No. 4,389,681 discloses an approach in which one-channel signals are encoded by an encoder and then distributed by demultiplexer in two or four tracks per block.

Since the error correction is performed across plural tracks, should a prolonged dropout be caused by, for instance, a scratch or a similar flaw in the tape, the data for one track are destroyed. Should short dropout occur in another track, error correcting compensation may become occasionally impossible, thus making it temporarily impossible to obtain reproduced audio signals.

An embodiment of the invention by which the disadvantage may be overcome is now described.

Figure 10:
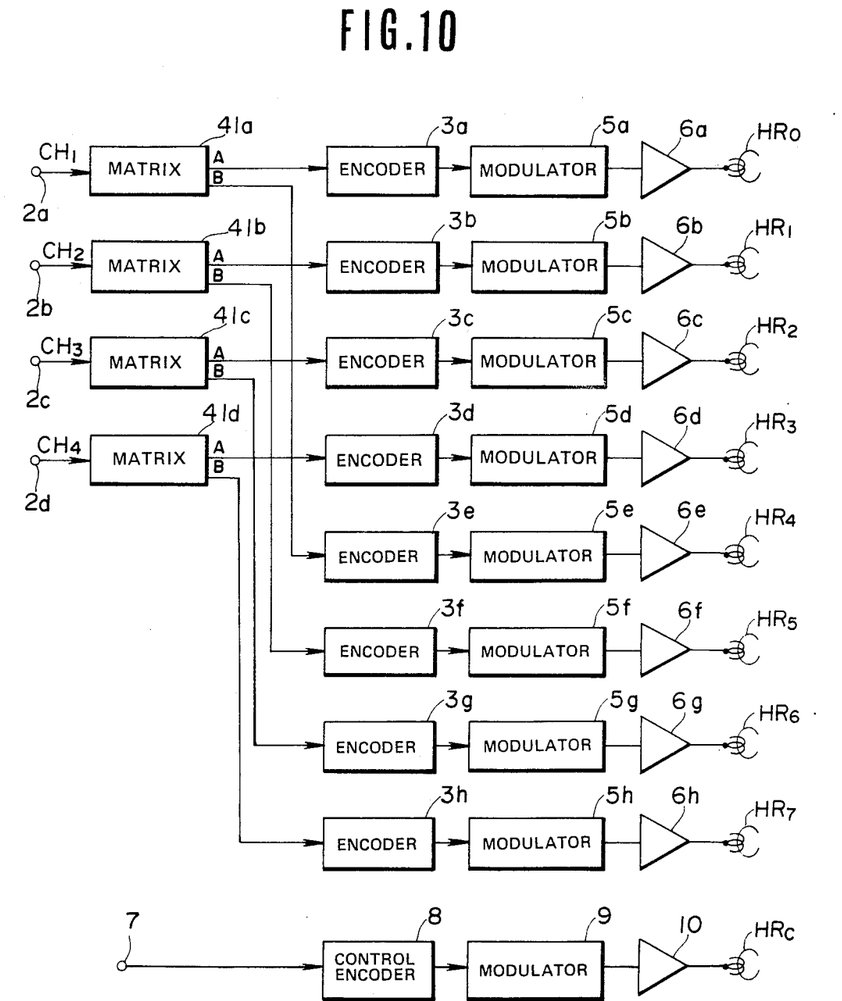
FIGS. 10 and 11 are block views showing the construction of the recording and reproducing systems for recording the format B according to an embodiment of the invention.
Figure 11:
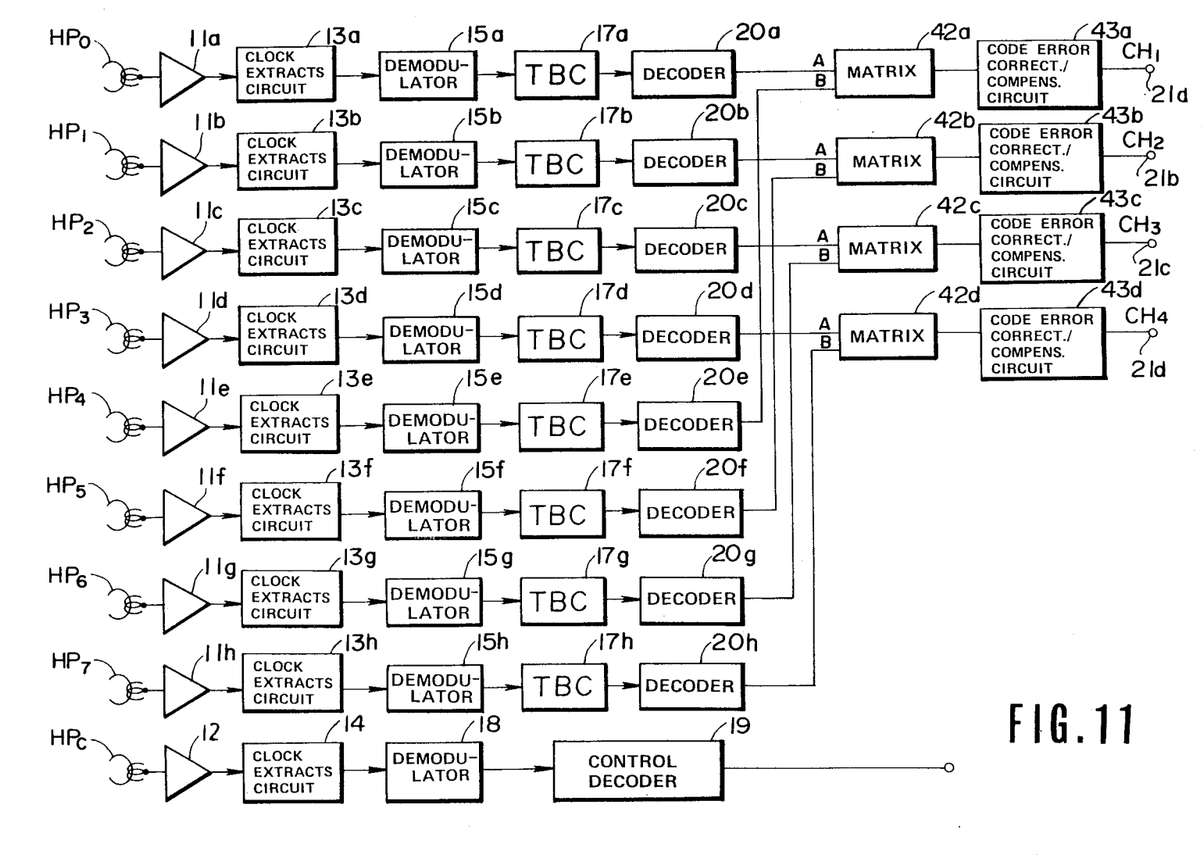

FIG. 10 shows the construction for the recording system for the format B shown in Table 1. FIG. 11 shows the construction of the reproducing system.

Referring to FIG. 10, audio PCM signals for $CH_1 - CH_4$ are supplied from the input terminals $2a$ to $2d$ to matrix circuits $41a$ to $41d$ operating as switching and distributing means. These matrix circuits $41a - 41d$ perform a kind of matrix transformation so that the respective words of the PCM signals are distributed in two tracks A, B per channel in accordance with predetermined matrix pattern. An example of the word sequence for the respective PCM signals distributed by the matrix circuits into tracks A, B is shown in Table 3 below, for the assumed word sequence $W_1$, $W_2$, $W_3$, $W_4$ ---.

TABLE 3

| Tracks A | $W_1$ | $W_2$ | $W_5$ | $W_6$ | $W_9$ | $W_{10}$ | ... |
| Tracks B | $W_3$ | $W_4$ | $W_7$ | $W_8$ | $W_{11}$ | $W_{12}$ | ... |

In the example of the above Table, the two consecutive words of the input PCM signal are distributed to one track so that the alternate odd and even relation of the original input PCM signal is maintained after distribution. This is in consideration of the fact that the data groups consisting of odd-numbered words are separated from the data groups consisting of even-numbered words at the time of interleaving at the encoder, these separate data series undergoing separate error correcting coding operations.

The following Table 4 shows another example of the distributing method capable of maintaining the even-odd sequence of the input PCM signals.

TABLE 4

| Tracks A | $W_1$ | $W_4$ | $W_5$ | $W_8$ | $W_9$ | $W_{12}$ | ... |
| Tracks B | $W_3$ | $W_2$ | $W_7$ | $W_6$ | $W_{11}$ | $W_{10}$ | ... |

The 2-track PCM signals from the matrix circuits $41a - 41d$ are supplied to eight encoders $3a - 3h$ associated respectively with the eight data tracks $TD_0 - TD_7$ in accordance with the B-format allotment shown in Table 2. Thus the track-A PCM signals of the respective matrix circuits $41a - 41d$ are supplied respectively to the encoders $3a - 3d$, while the track-B PCM signals of the matrix circuits $41a - 41d$ are supplied respectively to the encoders $3e$ to $3h$.

These encoders $3a - 3h$ operate in the same manner as the encoders $3a - 3h$ of FIG. 4 and are similarly constructed, as shown by way of an example in FIG. 6. In this case, the word numbers of the PCM signals supplied to the encoders 3a-3h shown in FIG. 10 are regarded as being independent of the word numbers of the PCM signals of the original channels. For example, when the words $W_1$, $W_2$, $W_5$, $W_6$, --- are supplied sequentially and successively as a result of the distribution of Table 3, the encoders will perform the above described interleaving and error correcting coding operations by regarding them as the first, second, third, fourth words etc. The encoding operation is effected in the respective encoders 3a to 3h in the manner as described in connection with FIGS. 6 to 8.

The data groups from the encoders 3a-3h are supplied via modulators 5a-5h and recording amplifiers 6a-6h to recording heads $HR_0$-$HR_7$, respectively.

The signals recorded in the control track TC are formed at control encoder 8 on the basis of the discerning and timing signals from terminal 7, and are supplied via modulator 9 and recording amplifier 10 to a recording control head $HR_c$.

In the reproducing system shown in FIG. 11, the outputs from the reproducing heads $HP_0$-$HP_7$ and $HP_c$ are supplied via reproducing amplifiers 11a-11h and 12 to clock extracting circuits 13a-13h and 14. The outputs from clock extracting circuits 13a-13h are supplied via demodulators 15a-15h to TBC's 17a-17h (time axis compensating circuits). The output from the clock extracting circuit 14 is supplied to a demodulator 18 where a reproducing control signal is generated and supplied to a control decoder 19. The output data groups from TBC's 17a-17b are supplied to decoders 20a-20h. These TBC's 17a-17h and decoders 20a-20h operate in the same manner as described in connection with FIGS. 5 and 9.

The PCM signals from the decoders 20a-20h appear in the same manner as the signals supplied from the above described recording matrix circuits 41a-41d to the encoders 3a-3h and constitute four-channel PCM signals with two of eight track signals corresponding to one channel. Inverse matrix circuits 42a-42d are provided for performing the inverse operation of the matrix circuits 41a-41d in order to synthesize two of eight track signals from the decoders 20a-20h for converting them into four-channel PCM signals. These inverse matrix circuits 42a-42d are of substantially similar construction and operate in such a manner that the input signal words of the two tracks A, B are taken out in the order of $W_1$, $W_2$, $W_3$, $W_4$, --- as shown in Table 3 for forming one-channel PCM signals. The relation between the eight decoders 20a-20h and the four inverse matrix circuits 42a-42d is the same as that between the eight data tracks $TD_0$-$TD_7$ of the format B of Table 2 and the four channels $CH_1$-$CH_4$.

The outputs from the inverse matrix circuits 42a-42d are supplied to coding error correction/compensation circuits 43a-43d for interpolating the interval destitute of signals so as to make up the operation of the decoders 20a-20h. This renders it possible to make an interpolation on the basis of the reproducing signals of the other track even when the reproducing signals of one track are absent for prolonged time. The reproducing audio signals of the respective audio PCM signals are taken at output terminals 21a-21d.

The above is an example of the recording and reproducing system of the PCM signals in accordance with the format B of the Tables 1 and 2. The recording and reproducing system of the format C is now explained by referring to FIGS. 12 and 13.

Figure 12:
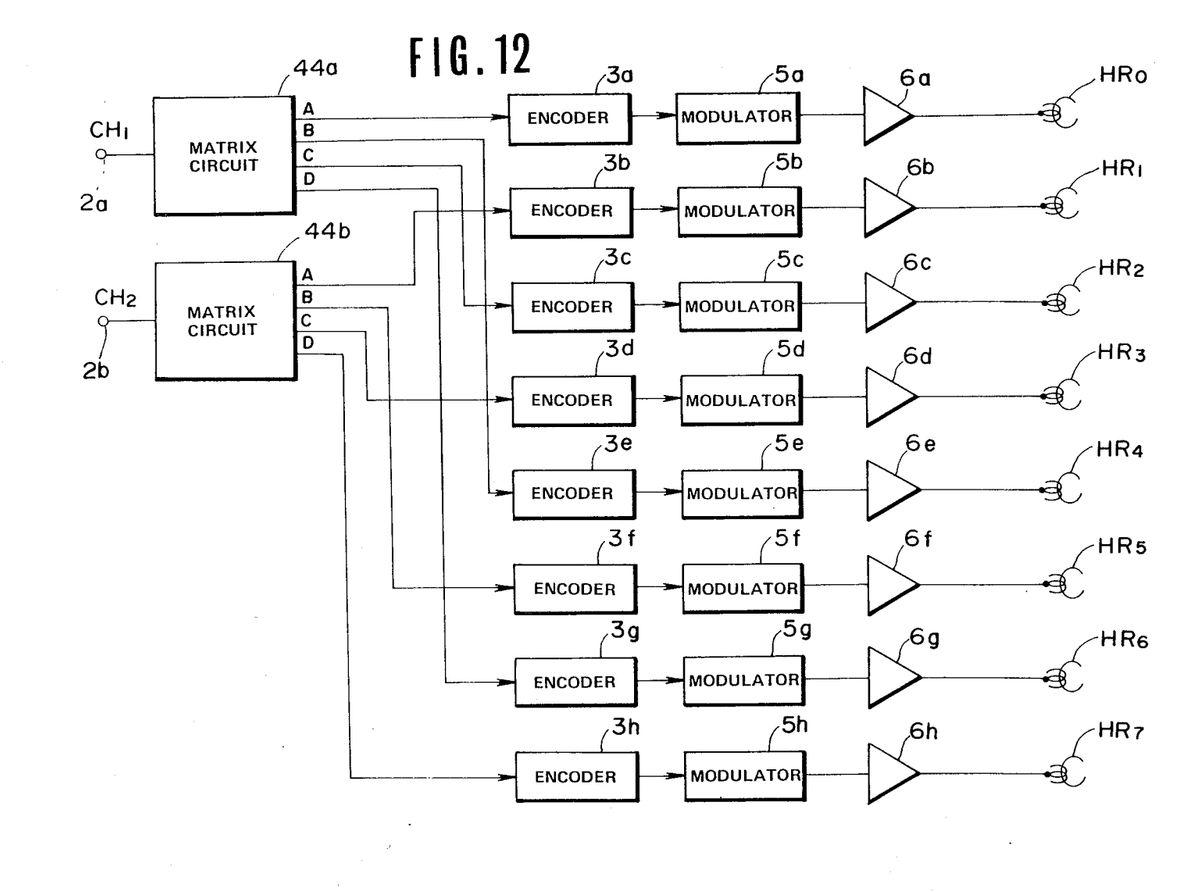
FIGS. 12 and 13 are block views showing the recording and reproducing systems for recording the format C according to a further embodiment of the invention.

FIG. 12 shows an example of the construction of the PCM signal recording system of the aforementioned format C. The PCM audio signals for the channels $CH_1$, $CH_2$ are supplied from input terminals 2a, 2b to matrix circuits 44a, 44b operating as switching distributing means. The matrix circuits 44a, 44b are constructed in the similar manner and operable for distributing 16 words of the input PCM signal to four tracks A, B, C and D in accordance with a 4×4 matrix pattern. Table 5 below shows the signal word sequence of the tracks A, B, C and D distributed by the matrix circuits for the assumed word sequence $W_1$, $W_2$, $W_3$, $W_4$ --- of the input PCM signals.

TABLE 5

| Tracks A | $W_1$ | $W_{14}$ | $W_{11}$ | $W_8$ | $W_{17}$ | $W_{30}$ | $W_{27}$ | $W_{24}$ | ... |
|---|---|---|---|---|---|---|---|---|---|
| Tracks B | $W_5$ | $W_2$ | $W_{15}$ | $W_{12}$ | $W_{21}$ | $W_{18}$ | $W_{31}$ | $W_{28}$ | ... |
| Tracks C | $W_9$ | $W_6$ | $W_3$ | $W_{16}$ | $W_{25}$ | $W_{22}$ | $W_{19}$ | $W_{32}$ | ... |
| Tracks D | $W_{13}$ | $W_{10}$ | $W_7$ | $W_4$ | $W_{29}$ | $W_{26}$ | $W_{23}$ | $W_{20}$ | ... |

In the distributing method of Table 5, the odd-even alternating relation of the input PCM signals is maintained in the output signals of the respective tracks A, B, C and D, in such a manner that the interleaving operation etc. in the succeeding encoder stage which considers the odd or even number of the words may be performed effectively.

It should be noted that other 4×4 matrix patterns other than that shown in Table 5 above may be devised so that the distributing method satisfying the alternating relation between the odd and even word numbers may be determined.

The 2-channel 8-track outputs $CH_1$-A-$CH_2$-D from these matrix circuits 44a, 44b are ultimately recorded in the data tracks $TD_0$-$TD_7$ in accordance with the allotment for the format C shown in Table 2. Thus the eight encoders 3a-3h are associated with eight data tracks $TD_0$-$TD_7$ and the outputs of the tracks A, B, C and D of the first channel $CH_1$ from the matrix circuit 44a are supplied respectively to encoders 3a, 3e, 3c, 3g, while the outputs of the tracks A, B, C and D of the second channel $CH_2$ from matrix circuit 44b are supplied respectively to encoders 3b, 3f, 3d, 3h. These encoders 3a-3h may be constructed and operated in the same manner as the encoders shown in FIGS. 4 and 6 to 8 so that the above described encoding operation is performed in the word sequence of the input signal (and thus independently of the word sequence of the original channel). The outputs from the encoders 3a-3h are supplied via modulators 5a-5h and recording amplifiers 6a-6h to the recording heads $HR_0$-$HR_7$ for recording and forming the aforementioned data tracks $TD_0$-$TD_7$. The control signal recording system is similar to that shown in FIG. 4 or FIG. 10 so that the corresponding description is omitted.

Figure 13:
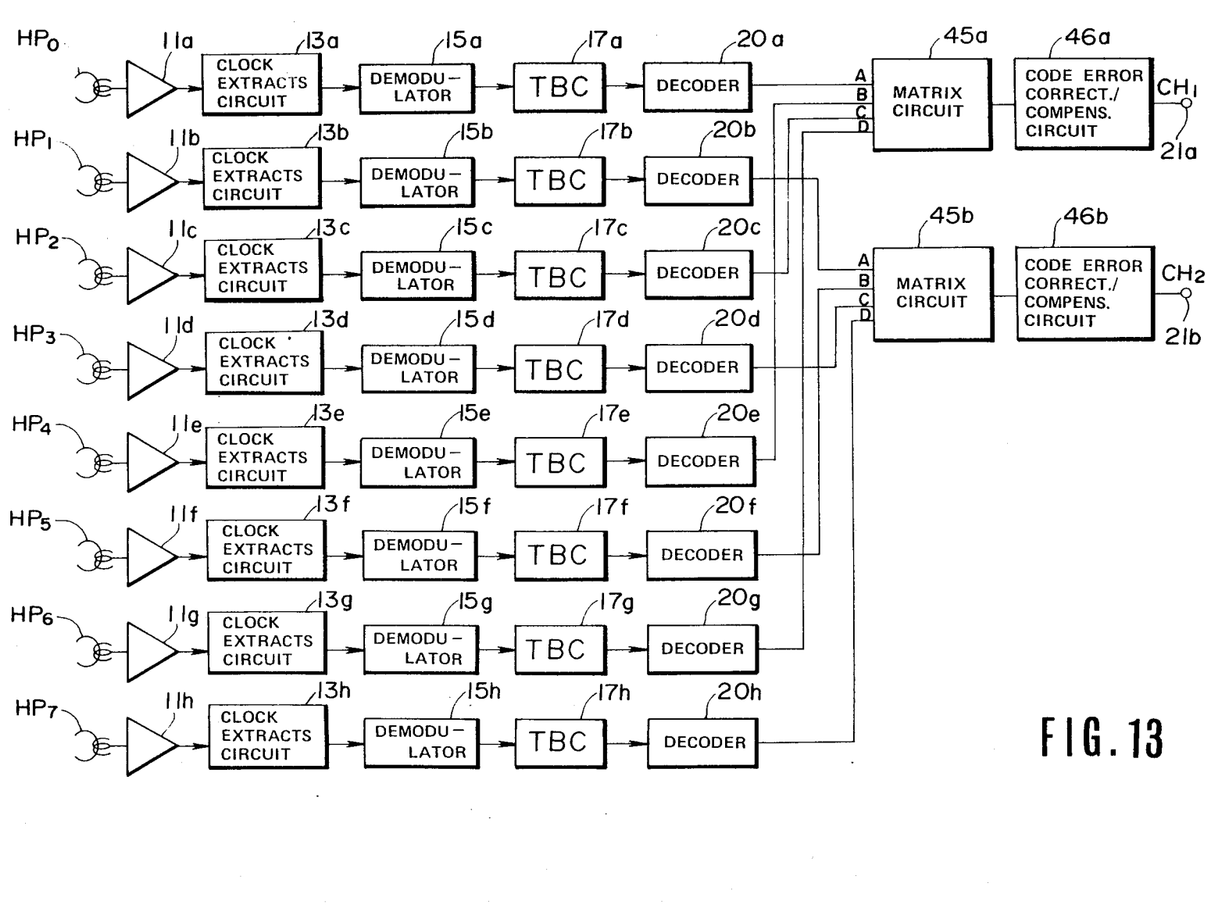

FIG. 13 shows an example of the construction of the reproducing system by means of which the data tracks $TD_0$-$TD_7$ recorded in accordance with the format C are subjected to a reproducing operation for producing the original PCM signals of the two channels $CH_1$, $CH_2$.

Referring to FIG. 13, the reproducing outputs from the reproducing heads $HP_0$-$HP_7$ facing to the data tracks TD₀-TD₇ are supplied via reproducing amplifiers 11a-11h to the clock extracting circuits 13a-13h. The outputs from the extracting circuits 13a-13h are supplied via demodulators 15a-15h to TBC's (time axis compensating circuits) 17a-17b. The outputs from TBC's 17a-17h are supplied to decoders 20a-20h performing the reverse of the operation of the aforementioned encoders. The outputs from decoders 20a-20h are the same as the signals supplied to the encoders 3a-3h from the matrix circuits 44a, 44b of the recording system shown in FIG. 12. For example, the outputs from the decoders 20a, 20e, 20c, 20g are in the sequence of the words of the tracks A, B, C, D shown in Table 5 and are supplied to an inverse matrix circuit 45a performing the reverse of the operation of the matrix circuit 44a. In addition, the outputs from the decoders 20b, 20f, 20d, 20h are supplied to an inverse matrix circuit 49b as signals of the respective tracks A, B, C and D for the second channel $CH_2$. By means of these inverse matrix circuits 44a, 44b, the signal words of the respective tracks A, B, C and D of the channels $CH_1$, $CH_2$ are taken in the word sequence $W_1$, $W_2$, $W_3$, $W_4$, --- shown in Table 5 so as to be used as PCM signals of the respective channels. The outputs from the inverse matrix circuits 44a, 45b are supplied respectively to coding error correction/compensation circuits 46a, 46b where the track interval destitute of signals is recovered by interpolation so as to make up the operations of the decoders 20a-20h. Thus, reproducing audio PCM signals for the channels $CH_1$, $CH_2$ appear respectively at output terminals 21a, 21b. The control signal reproducing system may be constructed as shown in FIGS. 5 or 11 so that corresponding description is omitted.

In the above described embodiments of the present invention, there is no necessity for providing separate circuits for the eight encoders 3a-3h or the eight decoders 20a-20h corresponding to the eight tracks, but a high-speed operating or processing circuit may be used in a time-sharing configuration so that the circuit operates as equivalent for eight encoders or eight decoders.

Furthermore, it may be so arranged that the formats A, B, C that are the aforementioned three kinds of the recording format may be discerned automatically so that, for example, the recording matrix circuits may be operated selectively as a function of the selected recording format so that a predetermined one of discriminating bits $C_{11}$-$C_9$ may be set in the control word as a function of the kind of the selected recording format. It may also be so arranged that, during reproduction, the recording format may be discerned from the discriminating bit for automatically selecting the reproducing inverse matrix circuit so that reproduction may be made in any of the aforementioned three kinds of the recording format.

From the foregoing it is seen that, in the PCM signal recording method of the present invention, the respective words of the PCM signal of one channel are distributed to the respective tracks in accordance with a predetermined distribution format, after which the signals are encoded by separate encoders for the respective tracks, so that error correction etc. may be performed by the decoding operation on each track, while data interpolation may be effectively utilized in the event that a given recording track should fail to perform data reproduction for prolonged time. In addition, the allowable limit for error occurrence or the error correction capability may be enlarged in comparison with the case of using an encoder or a decoder per each channel, thus making it possible to perform PCM signal recording and reproduction of higher quality.

INDUSTRIAL APPLICABILITY

As discussed above, the PCM signal recording method of the present invention may be advantageously applied to the fixed head type PCM recording and reproducing apparatus and makes it possible to provide a PCM recording and reproducing apparatus capable of successfully dealing with prolonged dropout especially due to tape flaws.

We claim:

1. A method for PCM signal recording wherein each channel of a multiple channel input PCM signal formed of a plurality of words is subjected to distribution to a plurality of recording tracks, characterized by the steps of selecting the number of tracks in which each said channel is to be divided, determining a distribution matrix pattern for said input signal words over said selected number of tracks, distributing said words in said channels to said recording tracks switching distributing means in accordance with said determined distribution matrix pattern, and in that the PCM signals composed of the distributed words and corresponding to the respective tracks are supplied to a plurality of recording heads via a corresponding plurality of separate encoders adapted to correct for coding error so that recording is made in such a manner that a plurality of recording tracks, determined in number as the product of the selected number of tracks and the number of channels, are formed on a recording medium.

2. The method for PCM signal recording as claimed in claim 1 characterized in that each said separate encoder divides words input thereto into odd-number word groups and even-number word groups, shifts the thus divided odd-number and even-number words by a predetermined period of time, subjects the odd-number words and the even-number words to code error correcting coding independently of each other, and outputs a combination of the thus divided and coded odd and even number words.

3. The method for PCM signal recording as claimed in claim 1 characterized in that said step of distributing said words in said channels in accordance with said predetermined distribution matrix pattern includes the step of distributing a first predetermined sequence of words of the PCM signals and a second predetermined sequence of words so as to be sequentially recorded in one recording track and in another recording track.

4. The method for PCM signal recording as claimed in claim 1 characterized in that said step of distributing said words in said channels in accordance with said predetermined distribution matrix pattern includes the step of distributing a word sequence of the PCM signal so as to be sequentially recorded across a selected one recording track and another recording track.

5. The method for PCM signal recording as claimed in claim 1 characterized in that said step of distributing said words in said channels according to said predetermined distribution matrix pattern includes the step of sequentially distributing a sequence of a predetermined number of words of the PCM signals so that these words are sequentially distributed in the respective recording tracks, whereby the order of words recorded in one recording track is modified.

6. The method for PCM signal recording as claimed in claim 1 characterized in that said step of distributing words of in said channels according to said predetermined distribution matrix pattern includes the step the providing a matrix circuit for matrix conversion of the words of the input PCM signals in accordance with said predetermined distribution matrix pattern for outputting a plurality of output word groups therefrom to said corresponding plurality of encoders and further includes the step of directly feeding outputs from said plurality of encoders to a corresponding plurality of modulators before said step of recording.

* * * * *